Jan. 21, 1969 J. T. TRACY ET AL 3,422,607
COTTON PICKER DOFFER
Filed Sept. 27, 1965 Sheet 1 of 2
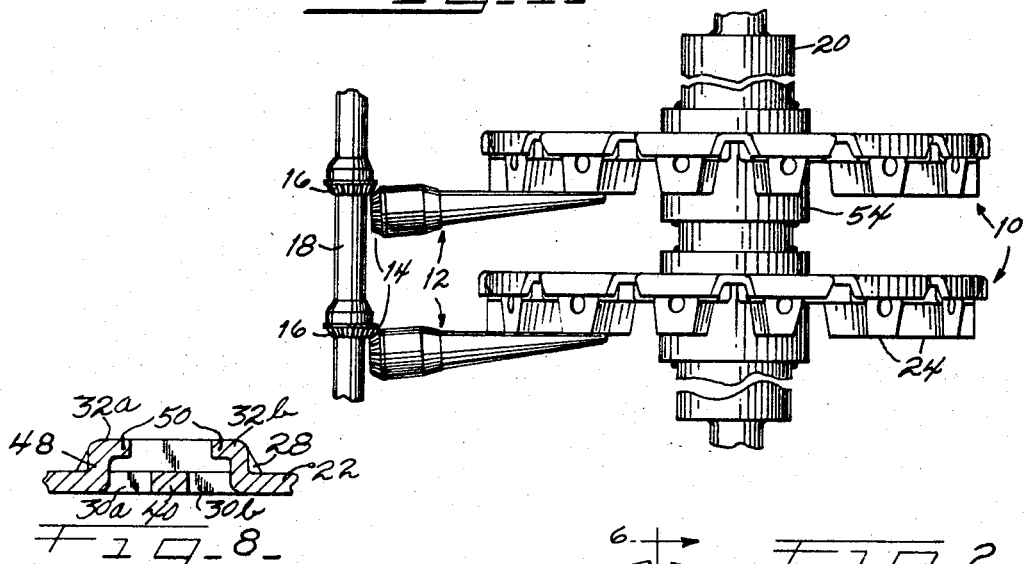
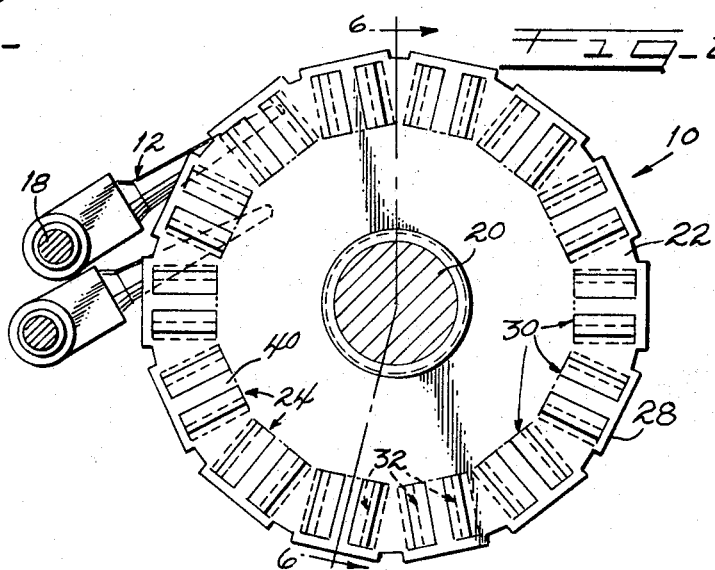
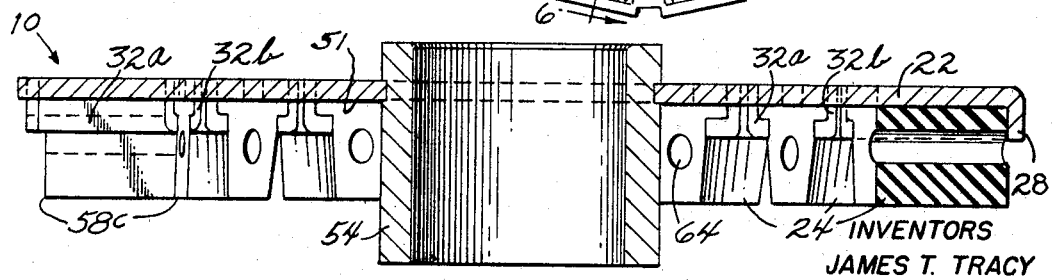
INVENTORS
JAMES T. TRACY
PAUL J. HULSEBERG
JAMES E. SADLER
BY John J. Kowalik
ATT'Y

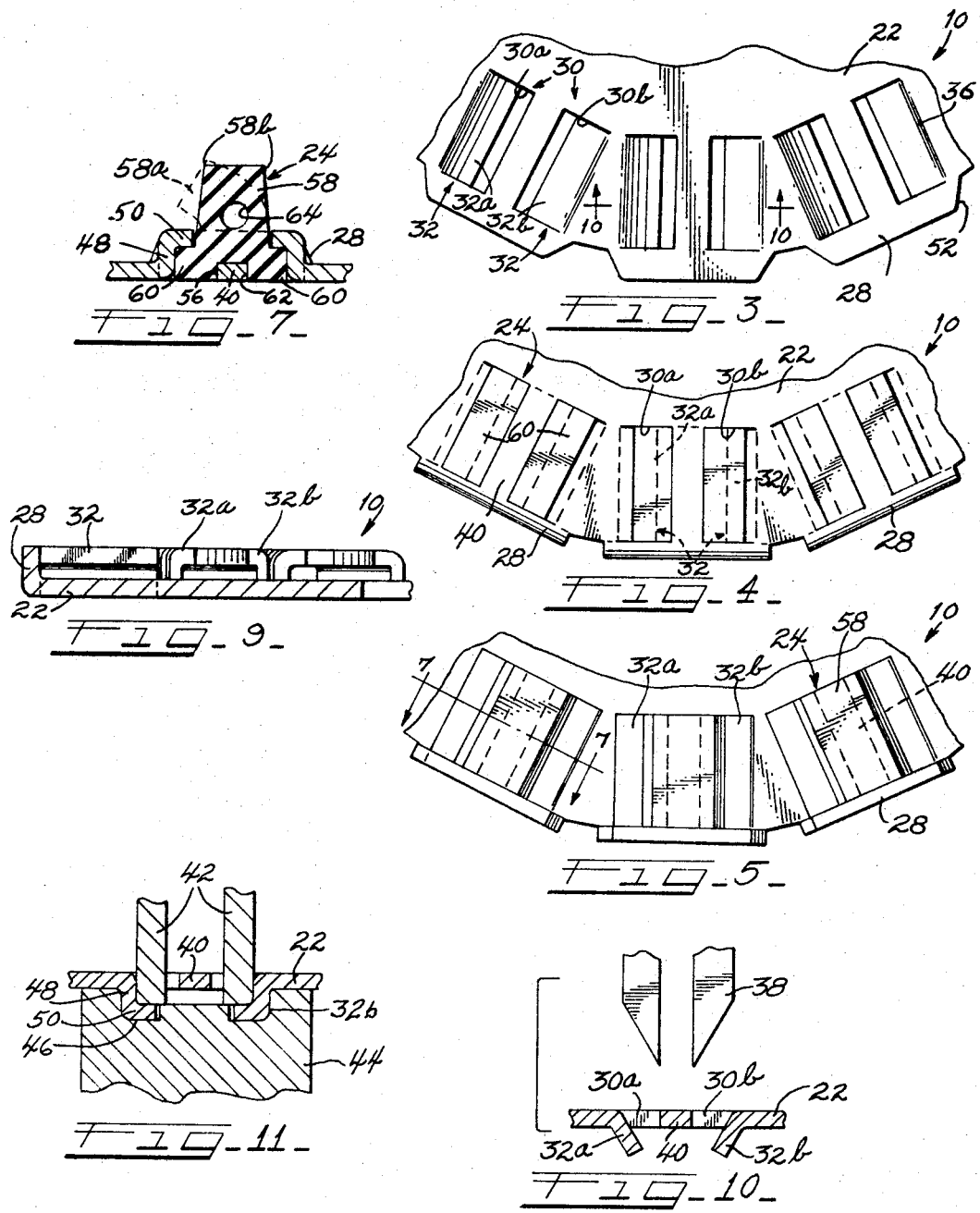

United States Patent Office 3,422,607
Patented Jan. 21, 1969

1

3,422,607
COTTON PICKER DOFFER
James T. Tracy, Paul J. Hulseberg, and James E. Sadler, Memphis, Tenn., assignors to International Harvester Company, Chicago, Ill., a corporation of Delaware
Filed Sept. 27, 1965, Ser. No. 490,440
U.S. Cl. 56—41        13 Claims
Int. Cl. A01d 45/18

ABSTRACT OF THE DISCLOSURE

A cotton picker doffer comprising an annular support plate with apertures about its periphery and having axially extending flanges adjacent to the radially outer ends of the apertures for abutment with lugs interlocked with the plate and located in the apertures, the lugs and plate having lateral interlocking elements axially offset from the plane of the plate.

---

The present invention relates to a cotton picker doffer.

The invention has to do with a doffer for use in a cotton picker of the kind wherein rotating spindles are projected into the cotton plants and rotated therein, as the picker moves along the plants. As the spindles are rotated, the cotton fibers of the bolls are wound or wrapped on the spindles and thus picked from the plant. The cotton fibers are then removed from the spindles by doffer means and carried in ain air stream to the storage basket of the picker. Such spindles and doffer means of the general character referred to above are known. In such an arrangement the spindles are arranged in a plurality of vertical rows, each row having a plurality of spindles. The doffer means includes a plurality of rotary members, one for each spindle in a row and the spindles are carried across the doffer members which have lugs directly engaging the spindles, removing the cotton therefrom in an unwrapping operation. The doffer members in the kind of mechanism referred to above are in the form of plates each having a plurality of lugs extending from one surface thereof, the lugs being for example of rubber or similar material having the desired resiliency characteristics. The lugs in so directly engaging the spindles are subjected to substantial wear and upon the wearing effect reaching a predetermined degree, the lugs must be replaced. Heretofore, the lugs generally were made unitary, or effectively integral, with the members on which they are mounted and in order to replace the lugs it was necessary to remove the complete doffer means and remove the members, or plates, carrying the lugs and replace them, resulting in serious downtime and other inefficiencies.

A broad object of the present invention is to provide in a cotton picker of the foregoing general character, doffer means of novel construction including plates with lugs detachably mounted therein, whereby upon the lugs wearing down, they can be individually replaced, with minimum downtime of the picker.

Another and more specific object of the invention is to provide doffer means for a cotton picker of the foregoing general character which includes a plate and individually removable lugs wherein the lugs can be removed and replaced with maximum facility and speed.

An additional object is to provide doffer means of the foregoing general character which includes a plate and lugs detachably mounted thereon, and including special construction whereby the interaction between the doffer means and spindles in the cotton removing operation biases the lugs in direction tending to retain them in position on the plate.

Still another object is to provide doffer means of the foregoing general character which includes a novel construction of plate and lugs detachably mounted thereon, wherein the plate is of such construction adapting it to formation by stamping operations.

Still another object is to provide a lug for use in doffer means of the foregoing general character of novel construction providing unusual resiliency.

A different object of the invention is to provide a novel doffer incorporating means for securing individual doffer lugs to the support plate and wherein said means and lugs are so constructed as to additionally serve to control the flexing of the lugs to minimize the wearing off of the sharp corners of the lugs which corners perform the function of snagging the cotton to unwrap it off the spindles.

Other objects and advantages of the invention will appear from the following detail description taken in conjunction with the accompanying drawings in which—

FIGURE 1 is a fragmentary elevation view of doffer means made according to the present invention, in conjunction with spindles with which the doffer means co-operates;

FIGURE 2 is a top view of FIGURE 1;

FIGURE 3 is a large scale fragmetary view of a plate utilized in the doffer means, oriented according to FIGURE 2, and shown in an intermediate state of construction;

FIGURE 4 is a large scale fragmentary view of a segment of a doffer member oriented according to FIGURE 2;

FIGURE 5 is a view similar to FIGURE 3 but from the underside;

FIGURE 6 is a sectional view taken at line 6—6 of FIGURE 2, but on an enlarged scale;

FIGURE 7 is a view taken at line 7—7 of FIGURE 5;

FIGURE 8 is a view similar to FIGURE 7 but with the lug absent therefrom;

FIGURE 9 is a fragmentary sectional view similar to one end portion of FIGURE 6 but with the lugs absent therefrom;

FIGURE 10 is a view of a portion of the doffer plate, taken at line 10—10 of FIGURE 3, and a tool utilized for lancing the plate in the fabrication thereof; and FIGURE 11 is a view indicating a shaping operation following that indicated in FIGURE 10.

Referring now in detail to the drawings attention is directed first to FIGURES 1 and 2 showing the fragmentary portion of the novel doffer means of the present invention together with picking spindles with which it is associated. FIGURE 1 shows two doffer members 10 and two spindles 12 with which they are respectively associated. The spindles 12 are of known kind and each has a beveled pinion 14 in mesh with a corresponding beveled pinion 16 mounted on a vertical picker bar including a shaft 18. In the usual construction of picker of this general type, a large number of spindles, such for example as sixteen, are associated with a shaft 18 and rotated in unison with that shaft. A plurality of such rows of spindles and corresponding shafts are provided and in addition to rotation of the spindles individually, the plurality of shafts are carried through a closed path for carrying the spindles through the cotton plants and to the doffers. FIGURES 1 and 2 show the spindles in direct association with the doffer members, the doffer members being operative for removing the cotton from the spindles in an unwrapping or unwinding operation. This kind of doffer means and spindles in general are also of known kind.

The present invention relates to specific improvement in the doffer members 10. One doffer member 10 is provided for each spindle in a row, the spindles in the different rows being carried successively into association with the doffer members. The members 10 are mounted on a vertical shaft 20 in any suitable manner, and rotated in the doffing operation. The details of construction of each doffer member 10 are shown in FIGURES 3 to 11 and it will be understood that all of the doffer members are identical.

Each doffer member 10 includes a plate 22 and a plurality of lugs 24 at the periphery of the plate and distributed therearound. The plate 22 is a rigid member and the lugs 24 are resilient, being made of rubber or rubber-like material. A principal feature of the invention has to do with the manner of forming the plate 22. In the present instance the plate is of steel and is shaped by a stamping or fabricating operation. A plate of any suitable size and shape is first utilized and is blanked to form a central hole 26 and tabs or flange portions 28 on its periphery. The plate is lanced in the same or a separate operation, to form apertures 30 associated with the corresponding tabs 28, each aperture, so called for convenience, being made up of a pair of mating apertures 30a and 30b. This lancing operation forms tabs 32a and 32b, each being defined by three lancing lines 34; FIGURE 3 also includes lines 36 about which the tabs are bent in the lancing operation and in a later forming operation. Elements 28, 32a and 32b may also be considered as wall elements.

FIGURE 10 indicates the lancing operation. The plate 22 is suitably positioned and supported, and tools 38 of known kind are struck against the plate for the lancing operation. The tabs 32a and 32b and the apertures 30a and 30b formed thereby are shown, the apertures being divided by a bar 40 inter-connected between the body of the plate and the outer peripheral tab 28.

The blank is then shaped as indicated in FIGURE 11 by forming tools 42 working in association with a bottoming die 44. The tool 42 strikes the tabs 32a and 32b and in conjunction with the cavities 46, shapes or coins the tabs. The tabs are thus generally L-shaped, having inner portions 48 extending generally perpendicular to the plane of the plate, and flanges 50 generally parallel with that plane and spaced therefrom, the flanges 50 of the associated tabs of each pair being directed inwardly toward each other and spaced apart.

In the blanking operation, the peripheral tabs 28 may be cut to any desired shape, such for example as being provided with diagonal or rounded corners 52, and in one of the shaping operations, such as that represented in FIGURE 11, the tabs 28 are bent perpendicular to the body of the plate and in the direction of the tabs 48. These peripheral tabs 28 therefore form walls at the radially outer ends of the apertures 30 as will be referred to again hereinbelow. Preferably these peripheral tabs 28 in their bent position are substantially equal in height to tabs 32.

The plate 22 is provided with suitable hub means 54 for mounting the completed doffer member on the shaft 20. Preferably the plate is secured to the hub by a cold working process such as disclosed and claimed in Sadler et al. Patent No. 3,190,134, dated June 22, 1965.

Attention is now directed particularly to FIGURES 4 to 7 for details of construction of the lugs 24 which are all the same in construction. The lugs 24 as indicated above are of resilient material, such as rubber, and each includes a relatively wide base portion 56 and a relatively narrow working end 58 which directly engages the spindles in the cotton removing operation. The base portion of the lug is provided with side flanges or ribs 60 and the underside is provided with a groove 62 whereby these side flanges or ribs 60 are also divided or separated on the bottom surface. The lug is elongated in radial direction (as viewed in FIGURE 6) relative to peripheral direction (shown in FIGURE 7) and provided with a hole 64 extending therethrough, in the elongated direction and positioned in the working end 58, spaced from the base portion. The hole may be round in cross section, as shown, or of other shapes, such as elongated in direction axially of the plate.

One lug is positioned in each aperture 30, and held in place by the side tabs 32 and the outer peripheral tab or flange 28. The lug is inserted in place by a suitable hand tool by inserting one end of the base portion under the flanges 50 of the side tabs and then pushed or worked radially outwardly until it engages the peripheral tab or wall element 28. The bar 40 is received in the groove 62 and the side flanges or ribs 60 fit into the pair of apertures 30a, 30b. These side flanges or ribs 60 are also engaged under the flanges 50 of the side tabs and when the lug is in place with the side flanges or ribs 60 in the apertures 30a, 30b, the lug is held snugly in position by all of the confining and surrounding elements, namely the peripheral tab or wall element 28, the bar 40, the side tabs including both the flanges 48 and the overlying flanges 50, together with the marginal edges of the body of the plate at the inner ends of the apertures 30a, 30b. The tabs 32 which include flanges 50 depend below the plate and specifically below the bottom face 51 of the plate 22. The base portion 56 thus extends into and through the apertures and its bottom surface is substantially flush with the corresponding surface of the plate, i.e., the lug does not project beyond that surface of the plate. Thus the lug is held in place effectively from six directions. The flush positioning of the base surface of the lug with the corresponding surface of the plate works toward efficiency in operation considering the fact that the spindles are positioned between adjacent doffer members (FIGURE 1) in the cotton removing operation, eliminating engagement with the spindle or the cotton thereon by a doffer member below that spindle. It will be understood that, as shown in FIGURE 1, the doffer members are arranged with the lugs extending downwardly where they engage the spindle.

The holes 64 in the lugs add resilience to the lugs, enabling greater flexing thereof and facilitating plying the lugs into place in the apertures. Also, the working ends 58 of the lugs are enabled to flex and bend a substantial amount, as indicated by the dot-dash line 58a of FIGURE 7. The wearing effect on the lugs, as is well known, is very great, but the hole 64 provides resilience in addition to the inherent resilience of the lug. The lug is thus able to yield under the action of the spindles with resulting reduction in wearing effect on the lug, but without significant diminution of the cotton removing capabilities of the lug. The extended end 58 of the lug is provided with relatively sharp, or nearly square, side corners 58b and end corners 58c, which penetrate into the mass of cotton fibers on the spindles and perform a biting action thereon for initiating the removing action. The greater resilience of the lug works toward retaining these sharp corners for a greater length of time.

The lug is firmly secured at its base portion, being rigidly confined against all lateral shifting movement by the corresponding elements of the plate, and held against separation from the plate by the flanges 50. The extended working portion flexes about various and progressive fulcrums established below the plate, producing a rolling action in the lug, the working portion thus yielding to a great extent in its engagement with the spindle. In this rolling and yielding action, the base portion is enabled to yield to a limited extent in the apertures notwithstanding the fact it is confined against lateral shifting as stated. The flanges 50, extending below the plate as they do, provide the kind of securement referred to while also positioning the lugs effectively entirely below the plate, with no portion extending above the plate where it could interfere with the spindles thereabove.

When it is desired to replace any of the lugs, they can be removed from their apertures or holders while the doffer members are in position, in a simple manner, and to do so it is not necessary to remove any other portion of the machine. Downtime is thus at a minimum and additional saving is realized in the fact that the lugs can be removed and replaced quickly, with corresponding saving in labor.

While we have shown and disclosed herein a certain preferred form of the invention it will be understood that changes may be made therein within the scope of the appended claims.

We claim:

1. A doffer comprising a plate having a generally flat peripheral portion and apertures distributed therearound, the plate having a peripheral flange portion at the outer edges of the apertures, and a lug removably secured in each aperture and extending from said peripheral portion, the plate at each aperture, and each lug, having interlocking conformation for preventing displacement of the lug from the aperture in directions transverse to the plane of the plate and the flange portion operating to prevent such displacement in a direction thereagainst in the plane of the plate.

2. A doffer comprising a plate having a generally flat peripheral portion and apertures distributed therearound, the plate having wall elements raised from a surface thereof along at least certain edges of the apertures, and a lug removably secured in each aperture and extending from said surface, the plate at each aperture, and each lug, having interlocking conformation for preventing displacement of the lug from the aperture in directions transverse to the plane of the plate and the wall elements operating to prevent such displacement and direction thereagainst in the plane of the plate, and wherein the wall elements at each aperture include at least one such element at the periphery of the plate and substantially tangent thereto at the radially outer extremity of the aperture, said one wall element being operable for withstanding displacement of the lug in radially outward direction.

3. The invention set out in claim 1 wherein said wall elements include two such on circumferentially opposite sides of each aperture and having inwardly directed flanges at their edges remote from said surface of the plate.

4. A doffer comprising a plate having a thin peripheral portion with a plurality of apertures therein and distributed therearound, the plate having a wall element at each aperture, the wall elements including an outer wall element disposed substantially tangent to the plate and at the radially outer edge of the aperture, and a pair of other wall elements at circumferentially opposite edges of the aperture and having flanges directed toward each other over the aperture, and a lug removably secured in each aperture having a relatively large base portion received between said circumferentially opposed wall elements and held by said flanges, and the outer wall element being disposed closely adjacent the outer edge of the aperture whereby the lug when in position in the aperture substantially engages the outer wall element and the latter is operative for preventing displacement of the lug in radially outward direction.

5. A doffer comprising a plate having a plurality of pairs of apertures through its peripheral portion and distributed therearound, the apertures of each pair being separated by a radial bar and the plate having a pair of circumferentially opposed wall elements at the edges of the apertures of the pair, the wall elements having flanges at their extended edges directed toward each other but spaced apart, the plate also having an outer wall element at each pair of apertures positioned substantially tangent to the plate and closely adjacent to the radially outer edge of the apertures of the pair, and a resilient lug removably secured in each pair of apertures, the lug including a relatively wide base portion and narrow working portion forming lateral ribs in the base portion, the base portion having a groove in a base surface forming ribs on opposite sides thereof, the lug when positioned in the aperture, being so positioned that the groove receives said radial bar and the ribs extend into the apertures of said pair and are received under said flanges, and the narrow working portion of the lug extends through the space between the circumferentially opposed wall elements in direction transverse to the plane of said plate.

6. A doffer comprising a rigid plate having a plurality of apertures about its periphery and a radial bar bisecting each aperture, and a plurality of resilient lugs removably secured on the plate at positions distributed around the periphery of the plate in said apertures in engagement with respective bars, said lugs extending axially from the plate at only one side of said plate.

7. A doffer rotatable about a predetermined axis, comprising a plate and a plurality of resilient lugs distributed around said axis, each lug having a base portion secured to the plate and a working portion extending from a surface of the plate, each lug being of substantially transverse dimensions and having a weakened zone therein whereby to facilitate flexing of the working portion of the lug relative to the base portion, and having cotton snagging edges on said working portion, and said weakened zone being oriented to accommodate deflection of said working portion circumferentially of the doffer.

8. The invention set out in claim 7 wherein each lug is provided with, and the weakened zone therein is enhanced by, a hole therein oriented radially with respect to the axis of rotation of the doffer.

9. A doffer comprising a rigid plate and a plurality of resilient lugs detachably secured to the plate at positions distributed around the periphery thereof, the plate and lugs having interlocking conformations operative for substantially prohibiting displacement of the lugs from the plate in all directions except radially inwardly, the lugs having substantial dimension transverse to the plate and also being relatively elongated radially of the plate, and each lug having a transverse hole therethrough in its long direction radially of the plate whereby to facilitate flexing of the extended ends of the lugs about axes parallel with the axes of the holes.

10. A doffer of the character disclosed comprising a stamped steel plate having a plurality of apertures therethrough at positions distributed around the periphery thereof and wall elements around at least certain edges of each aperture, the wall elements at each aperture including an outer wall element substantially tangent to the plate and disposed at the outer edge of the aperture, and a pair of circumferentially opposed wall elements having inturned flanges at their extended edges, and resilient lugs in the apertures, the lugs having a base portion including lateral ribs engaged under the flanges of said circumferentially opposed wall elements and having central working portions extending between the wall elements in direction perpendicular to the plane of the plate.

11. A doffer lug comprising a member of resilient material having a relatively large base portion adapted for interlocking engagement with retaining elements on a plate, and a relatively reduced extended portion, the lug having a transverse hole therethrough in the extended portion at a point removed from the base portion.

12. A doffer lug comprising a unitary member of resilient material having relatively long and short transverse dimensions, and having a relatively wide base forming laterally outwardly directed ribs, and a groove in its base surface forming ribs in its base surface corresponding with the lateral ribs, and a relatively narrow working extension, and the working extension having a transverse hole therethrough extending in the long direction of the member and displaced from the base portion.

13. A doffer comprising a plate, doffing means including a lug comprising a member of resilient material having a base portion at one end adapted for attachment to said plate, and an axially extending working portion including a hollow section remote from the base and spaced from adjacent portions of the plate to enhance the flexibility of the working portion.

References Cited

UNITED STATES PATENTS

| | | | |
|---|---|---|---|
| 2,247,682 | 7/1941 | Hagen | 56—44 |
| 2,654,203 | 10/1953 | Parkerton | 56—41 |
| 2,699,026 | 1/1955 | Cassidy | 56—41 |
| 2,699,029 | 1/1955 | Hubbard | 56—41 |

RUSSELL R. KINSEY, *Primary Examiner.*